Sept. 8, 1936.　　　N. H. HILLER ET AL　　　2,053,664
CONTINUOUS FILTER
Filed June 20, 1934　　　3 Sheets-Sheet 1
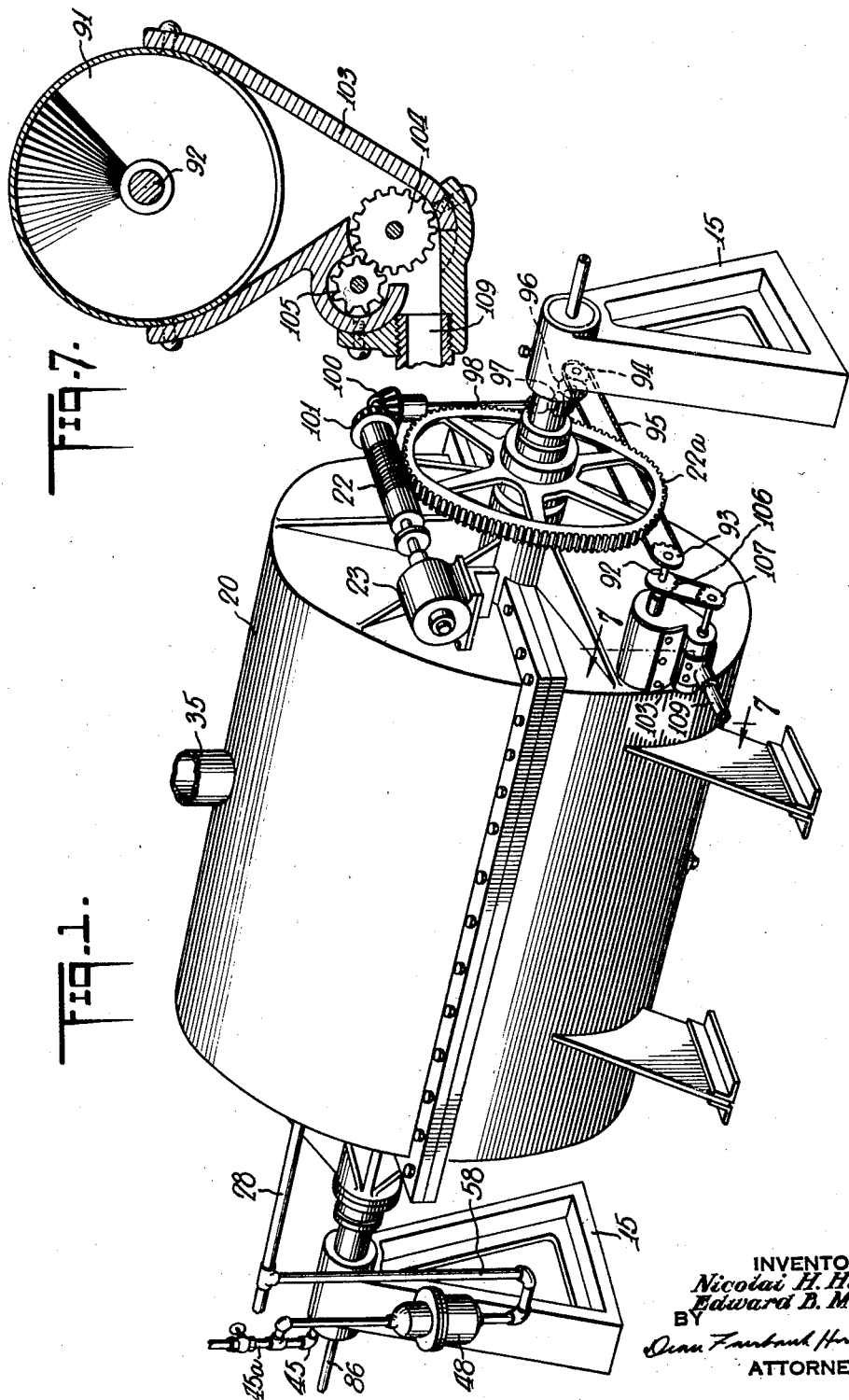
INVENTOR
Nicolai H. Hiller
Edward B. McCabe
BY
ATTORNEYS Sept. 8, 1936.　　　　N. H. HILLER ET AL　　　　2,053,664
CONTINUOUS FILTER
Filed June 20, 1934　　　　3 Sheets-Sheet 2
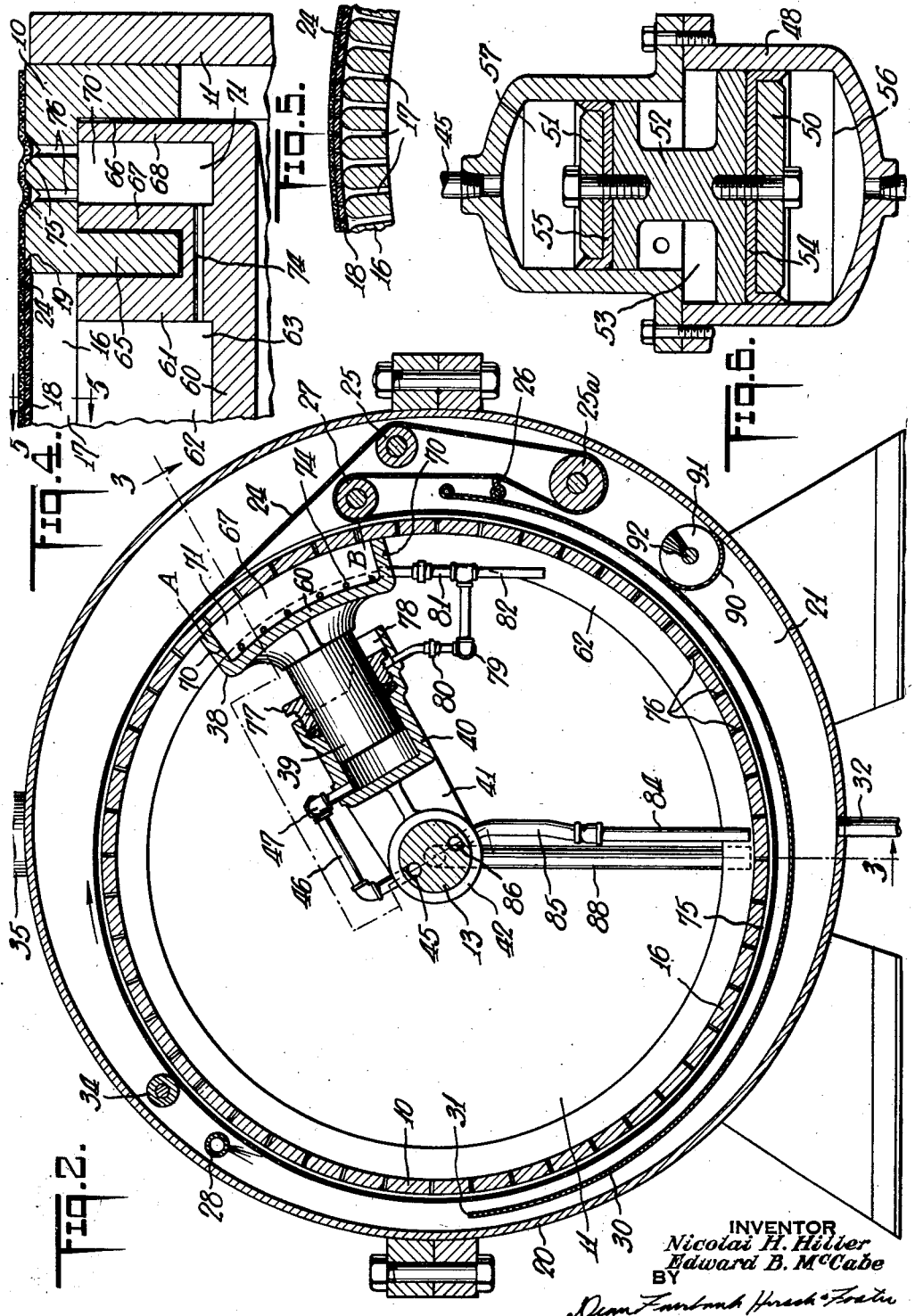
INVENTOR
Nicolai H. Hiller
Edward B. M^cCabe
BY
ATTORNEYS

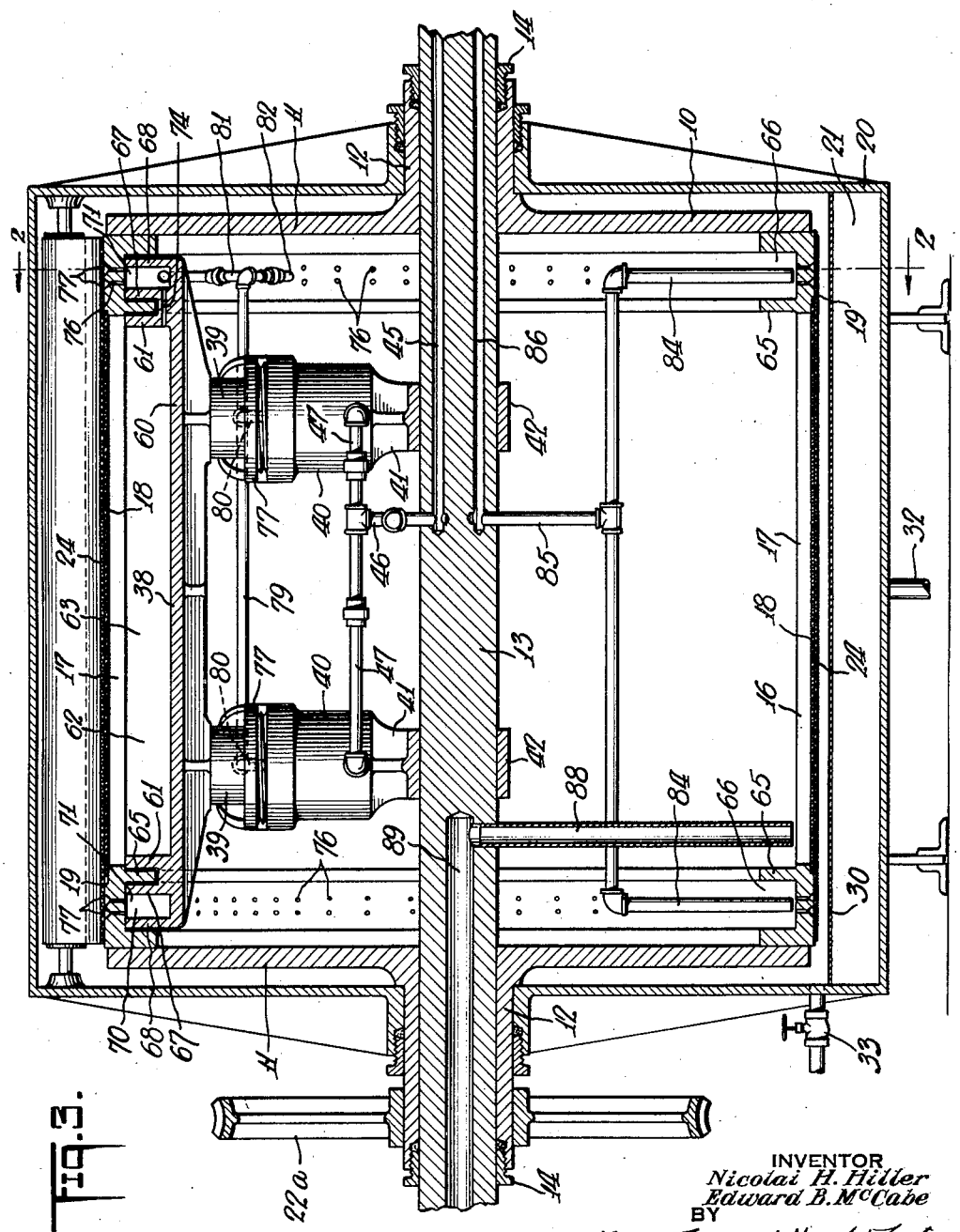

Patented Sept. 8, 1936

2,053,664

UNITED STATES PATENT OFFICE 2,053,664

CONTINUOUS FILTER

Nicolai H. Hiller and Edward B. McCabe, Carbondale, Pa., assignors, by mesne assignments, to Worthington Pump and Machinery Corporation, Harrison, N. J., a corporation of Virginia Application June 20, 1934, Serial No. 731,431

10 Claims. (Cl. 210—198)

The present invention relates to filter presses of the type in which there is employed a filtering belt which passes around a rotary supporting drum having a skeleton or apertured periphery, partly immersed in a bath of the material to be filtered. The solids are deposited upon the surface of the belt as the filtrate passes through due to a differential pressure maintained between the inside and outside of the drum. The belt engages and leaves the drum surface at circumferentially spaced sections to permit the removal of the solids from the belt.

One object of the present invention is to provide a continuous filter of the drum type in which the differential pressure is maintained by delivering under pressure the fluid to be filtered, so that it is not necessary to maintain any vacuum, and any leakage will be outwardly rather than of air inwardly.

Another object is to provide new and improved means for sealing the gap on the peripheral wall of the drum between the lines where the filtering belt engages and leaves the drum surface, to prevent the loss of pressure differential through the portion of the wall which is not covered by the belt.

As a feature of the invention, the sealing means is mounted on the inside of the rotary drum so that it does not interfere with the movement and positioning of the filtering belt, and so that a more compact unit results.

As another feature the sealing means is in the form of a fluid actuated valve plate pressing against that portion of the rotary drum not protected by the filtering belt.

As a further feature, the fluid to be filtered is delivered under pressure and this pressure is utilized and furnishes the power to maintain the sealing valve in position under the desired pressure.

As a further object, new and improved means are provided for removing the solids from the belt and for delivering them to a point outside of the apparatus.

As still another feature, means are provided whereby any leakage of actuating liquid from the pressure cylinder of the sealing valve and/or any leakage through the portion of the drum acted upon by the valve plate, is discharged from the drum without coming in contact with the filtered liquid.

As a further feature, the various fluids are delivered into and out of the interior of the drum through conduits having portions extending lengthwise of the stationary axle supporting the drum, so that the drum may be sealed at its ends and rotated without interference from these conduits.

As another feature, means are provided for sealing the side portions of the filtering belt onto the rotary drum to prevent any substantial amount of liquid to be filtered from passing between the side portions of said belt and the outer periphery of said drum, and to prevent loss of differential pressure through said side portions.

In the accompanying drawings, there is shown for the purpose of illustration, one embodiment of our invention.

In these drawings:—

Fig. 1 is a perspective view showing one form of our improved filter,

Fig. 2 is a vertical section taken on the line 2—2 of Fig. 3,

Fig. 3 is a section taken on the line 3—3 of Fig. 2,

Fig. 4 is a section on a larger scale showing details of the portion shown on a smaller scale in Fig. 3, Fig. 5 is a section taken on the line 5—5 of Fig. 4, Fig. 6 is a longitudinal section through the pressure booster used for maintaining the sealing valve fluid under pressure, and Fig. 7 is a section through the solid discharging mechanism.

Although filters embodying our invention may be employed for filtering a wide variety of liquid, the specific form shown in the drawings is particularly designed for filtering distillate or other oils to remove the waxes and other solids separating out at low temperature.

In the specific embodiment of the present invention, there is provided a rotary drum 10 having a pair of end walls 11 formed with cylindrical extensions or hubs 12 which embrace a stationary axle 13, and which have suitable stuffing boxes into which are threaded glands 14. The axle may be supported in any suitable manner, as for instance by supports 15.

The drum 10 is provided with a skeleton or reticulated peripheral wall 16 which may be formed of cast iron, with a series of elongated slots or apertures 17 formed therein, and extending lengthwise of said peripheral wall in grid fashion, so as to produce a series of bars around the entire circumference of said wall. The series of bars forming the peripheral wall 16 are covered on the outside with perforated metal comprising, in the specific form shown, a series of perforated plates 18, inset between a pair of annular shoulders 19 adjacent to the ends of the wall 16. The bars forming the wall 16 are preferably curved on their radially outer sides, so that practically none of the perforations of the plates 18 are covered by said bars.

The drum 10 is enclosed in an air-tight stationary casing 20 having stuffing box connections with the hubs 12 and forming with said drum an annular chamber 21 for receiving in separate compartments both the liquid to be filtered and the filtrate.

The drum 10 may be rotated by any suitable means. In the construction shown, one of the hubs 12 of the drum 10 has fixed thereto a worm wheel 22a meshing with a worm 22 driven from a motor 23 suitably supported from an end wall of the casing 20.

Passing around the periphery of the drum 10 is a continuous or endless belt 24 made of pervious or filtering material such as canvas to permit the filtrate to pass therethrough while retaining the wax or other solid residue thereon. This canvas belt 24 engages a substantial circumferential portion of the drum surface and travels therewith in a clockwise direction as shown in Fig. 2. The belt leaves the drum surface tangentially at A, passes over rollers 25 and 25a extending lengthwise in the space 21, then into operative relationship with a suitable scraper 26 which removes the wax residue remaining on the belt, and then over a roller 27 and into engagement with the surface of the drum at B. The casing 20 is so designed as to allow room for these rollers on one side of the drum without unduly enlarging said casing. Preferably the casing is cylindrical and mounted eccentrically in respect to the drum to provide the space for the rollers above referred to.

The liquid to be filtered is introduced into the annular chamber 21 under pressure through an inlet pipe 28 extending lengthwise of the casing 20, and disposed close to the belt at a point above the axis of the drum 10. The pipe 28 has a series of perforations extending along its length and directed towards the belt for delivering the liquid directly upon the upwardly moving run of the moving belt 24, so that it flows down the surface of the moving belt towards the bottom of the chamber 21.

In order to maintain a substantially constant lever of unfiltered liquid in the casing 20 and to separate it from the solids removed from the belt, there is provided a partition 30 in the lower portion of the chamber 21, curved concentrically with respect to the peripheral wall of the drum 10 to form with the end walls of the casing 20 a comparatively thin curved trough or reservoir for the unfiltered liquid delivered through the pipe 28. The left-hand edge 31 of this plate, as shown in Fig. 2, is lower than the right-hand end, so that said edge 31 acts as a weir or overflow for the surplus liquid. The liquid overflows into the section of the chamber 21 on the outside of and below said partition 30, and may be withdrawn from the casing 20 through a suitable drain pipe 32. A similar drain pipe 33 may be provided for the trough formed by the plate 30.

As the belt 24 moves with the drum 10, it submerges in the body of liquid above the partition 30, and the filtrate passes through the belt while the solids collect on the outer surface thereof and form a layer which is carried up out of the liquid. A suitable pressure or squeegee roll 34 is provided above the supply pipe 28 for removing excess unfiltered liquid from the solids on the surface of the belt, and for smoothing off the layer of said solids.

A sufficient differential pressure is maintained between the inside and outside of the drum 10 to cause the filtrate to pass through the belt 24 during the travel of the latter in the liquid, and to dry the solids on the belt above the level of the liquid. For that purpose, the casing 20 is provided at its upper side with an inlet 35 communicating with a suitable source of supply of inert gas under pressure. The differential pressure on the inside and outside of the drum may be about 30 pounds for oil filtering, and in that case the gas may be delivered at about 45 pounds absolute and the interior of the drum 10 may be maintained at or about atmospheric pressure or 15 pounds absolute. This pressure differential between the inside and outside of the drum 10 may be maintained by raising or lowering either of these pressures.

The portion of the drum between points A and B where the belt leaves the drum surface and again engages it, is not protected by the belt, and it is important to prevent loss of differential through this portion. Means are provided for sealing said portion of the drum periphery against such loss of pressure. In the specific form shown, said means includes a valve disposed in the interior of the drum 10, and comprising a plate 38 connected to one or more plungers 39, two of such plungers being shown. The plate 38 is urged radially of the drum by said plungers against the wall of the drum to seal the exposed portion of the drum 10. These plungers operate respectively in cylinders 40 extending radially of the drum 10 and having brackets 41 at their radially inner ends terminating in sleeve portions 42 encircling and supported by the axle 13 and fixed thereto. The cylinders 40 are supplied with a suitable fluid under pressure to force the valve plate 38 outwardly with the required force to form the seal. This liquid may be supplied through a passage 45 in the stationary axle 13, a pipe 46 and branches 47.

The incoming liquid to be filtered and which is delivered under pressure may be employed as the actuating fluid for the cylinders 40. For that purpose, the outer end of the conduit 45 may be connected to the booster shown in Fig. 6. This includes a casing 48 having cylinders 56 and 57 of different diameters, and a differential plunger in the form of a piston 50 and a smaller piston 51 connected together by a stem 52. Between the pistons is a chamber 53 which may be open to the atmosphere.

The conduit 45 may be connected to the smaller pressure chamber 57, while the inlet pipe 28 may have a branch connection 58 to the larger pressure chamber 56. Due to the difference in the sizes of the pistons 50 and 51, the pressure of the fluid in the pressure chamber 57 will be greater than the pressure of the liquid acting upon the piston 50, this boosted fluid pressure being greater than the pressure differential between the inside and outside of the drum, and sufficient to maintain the valve plate 38 in sealing contact with the inner periphery of the drum 10. The actuating fluid for the sealing valve may be a portion of the filtrate, so that if any of this distillate finds its way into the body of distillate being processed, it will not contaminate it to any great extent. The conduit 45 may have a suitable branch connection 45a to a pump (not shown) to be operated in case the liquid in the hydraulic valve system has been materially reduced by leakage.

The plate 38 is preferably trough or channel shaped and includes a bottom wall 60, end walls 61 and side walls 62 forming a chamber 63 with the inner periphery of the drum 10 wider than the distance between the points A and B. These walls are curved at their radially outer ends in conformity with the inner periphery of the drum to effect sealing contact between said ends and the inner periphery of the drum. Thus only the edges of the walls 61 and 62 engage the surface of the drum, and there is the minimum resistance to the rotation of the drum.

The periphery of the drum 10 is provided near its ends with radially inwardly extending flanges 65 forming annular channels 66 with the ends of said drum. The bottom wall 60 of the plate 38 extends beyond the end walls 61, and has a pair of radially outwardly extending flanges 67 respectively extending into the channels 66, and spaced from the end walls 61 to form guide channels into which the flanges 65 of the drum 10 extend. The outer ends of the bottom wall 60 have a pair of radially outwardly extending flanges 68 spaced from the flanges 67 and extending into the channels 66. The flanges 67 and 68 at each end of the plate 38 are connected by end walls 70 to form a collecting chamber 71. This chamber 71 communicates with the chamber 63 through a series of holes 74 passing through the flanges 61 and 67 at one or both ends of the plate 38, so that the liquid which leaks into the chamber 63 will drain into said chamber 71.

In order to seal the sides of the filtering belt 24 onto the periphery of the drum 10 to prevent any substantial bypass or leakage of unfiltered liquid between the edges of said belt and said drum periphery, said periphery is provided near each end with a pair of V-shaped grooves 75 opposite the chamber 71 and communicating therewith through a series of holes 76. The differential pressure between the inside and outside of the drum 10 causes the portion of the belt 24 opposite to the grooves 75 to be drawn inwardly into said grooves as shown in Fig. 4, thereby forming an effective seal between said belt and said drum.

In order to prevent any leakage from the hydraulic cylinders 40 from finding its way into the body of filtrate in the interior of the drum 10, the cylinders are inclined with respect to the horizontal as shown, and the radially outer ends of said cylinders are enlarged for receiving glands 77, and for forming pockets 78 into which the leakage from the cylinders collects. This leakage is drawn off through a pipe connection 79 having branch connections 80 leading into the pockets 78 and terminating at one end in a pair of branch connections 81 and 82, the connection 81 leading into the collecting chamber 71, while the other connection 82 extends into the channel 66 for discharging the leakage liquid into said channel from the cylinder 40 and from the chamber 71.

The waste oil collected at the bottom of the channel 66 is drawn off through a pair of pipes 84 extending into said channels and branching off from a pipe 85 leading to one end of a passage 86 from a pipe 85 leading to one end of a passage 86 which extends lengthwise of the axle 13 and which is in communication at the other end with a suitable suction pump (not shown).

The filtrate collecting in the bottom of the drum 10 between the flanges 65 is drawn off through a pipe 88 extending at one end to the bottom of the drum and having the other end communicating with a passage 89 extending lengthwise of the axle 13 and communicating with a suitable suction pump (not shown).

The cake of wax or other solid which is stripped or broken from the belt 24 as it passes over the rollers 25 and 25a or by the action of the scraper 26, drops onto a trough 90 extending lengthwise in the chamber 21 below and outside of the partition 30 and closing the space between said partition and the wall of the casing. It is conveyed along said trough by a screw conveyer 91 which may be driven through any suitable means, for instance by a shaft 92 extending outside of the casing 20 and provided with a sprocket wheel 93 driven from a sprocket wheel 94 by means of a chain 95. The sprocket wheel 94 may be mounted on a shaft with a bevel gear 96 which meshes with a bevel gear 97 at one end of a shaft 98, the other end having a bevel gear 100 meshing with a bevel gear 101 mounted on the shaft of the worm 22.

The conveyer extends through the end wall 11 into a casing 103, and as the material is conveyed from the trough 90 into said casing 103, it falls into the lower part which communicates with a gear pump comprising gear wheels 104 and 105 driven by any suitable means, as for instance from the conveyer shaft 92 through sprocket wheels 106 and 107 and a connecting chain. The wax or other solid is discharged from the casing 103 by the gear pump into an outlet conduit 109 or into any suitable receiver.

In the operation of the machine, the drum 10 with the belt 24 are continuously rotated to submerge the belt 24 in the body of liquid in the trough formed by the partition 30. The belt 24 picks up a layer of solids on the outside thereof as the filtrate passes through the belt. As the belt 24 moves upwardly above the liquid level, the layer is dried by the forcing of residual liquid through the belt. As the belt moves in contact with the squeegee roll 34, the excess distillate is removed from the belt 24. The movement of the belt is continued at such speed that by the time a portion of the belt has reached the roller 25, the solid remaining on the outside of said portion may be hardened into a cake, so that curving of the belt around the roller 25 causes some or all of this cake to be broken off. This breaking action is continued as the belt passes over the roller 25a. The scraper 26 removes the residue from the belt surface.

It will be noted that the belt does not move out of the pressure chamber, that the apparatus is very compact and continuous in its operation, is easy and inexpensive to build and operate, and has no parts which are liable to get out of order. There is a very small amount of the liquid maintained in the apparatus, as the space between the partition 30 and the drum is very thin and the filtrate may be drained out as soon as it passes through the filter web or belt. Thus the apparatus is particularly adapted for the filtering of hot or very cold liquids, there being no large body of liquid being maintained in the apparatus and which may change in temperature before it can be filtered. As the liquid is maintained in a closed chamber and out of contact with the atmosphere, there is no loss of volatile constituents and no liability of fire in case the liquid or vapors be combustible.

Having thus described our invention, what we claim as new and desire to secure by Letters Patent is:—

1. A filter comprising a rotary drum having an apertured periphery, a filtering belt passing partially around the periphery of said drum and engaging and leaving said drum at circumferentially spaced points, a casing encircling said drum, means for maintaining a pressure within said drum, means for delivering liquid to said casing, a fluid actuated valve for sealing the portion of the drum periphery between said points for preventing loss of differential pressure through said portion, means connected to said liquid delivery means and to said fluid actuated valve and operated by pressure of incoming liquid for applying to the fluid which actuates said valve a pressure greater than that within said casing, and means for withdrawing filtrate from the interior of said drum.

2. A filter comprising a rotary drum having an apertured periphery, end walls, and a flange extending radially inwardly from said periphery and forming with one of said end walls an annular channel, a continuous filtering belt passing partially around the periphery of said drum, a hydraulically actuated valve in said drum for sealing the remaining portion of said drum periphery, whereby a differential pressure between the inside and outside of said drum may be maintained, and means for delivering the leakage from said hydraulically actuated valve to said annular channel.

3. A filter comprising a stationary axle, a rotary drum supported on said axle and having an apertured periphery, a filtering belt passing partially around the periphery of said drum, a fluid actuated valve in the interior of said drum for sealing the remaining portion of the drum periphery, whereby a differential pressure may be maintained between the inside and outside of said drum, said valve including a cylinder extending radially of said drum, a sleeve connected to said cylinder, embracing said axle and fixed thereto, a plunger in said cylinder, and a plate connected to said plunger and engaging said drum periphery.

4. A filter comprising a rotary drum having its peripheral wall provided with circumferential grooves near each end thereof, and passages connecting said grooves and the interior of said drum, a filtering belt passing partially around the periphery of said drum, and means for maintaining a differential pressure between the inside and outside of said drum for forcing the material to be filtered through said belt into the interior of said drum, said differential pressure also serving to force the portion of the belt opposite to the grooves towards the interiors of said grooves to effect sealing contact between the edges of said belt and said drum.

5. In a filter, a rotary drum, a filtering belt passing partially around said drum, a valve plate in the interior of said drum for sealing the portion of the drum periphery about which said belt does not pass, means operated by pressure of fluid filtered to maintain said valve in tight engagement with said drum, means for maintaining a differential pressure between the inside and outside of said drum, said drum having circumferential grooves therein near its ends and provided with passages connecting said grooves and the interior of said drum whereby the edges of said filtering belt will be maintained in sealing contact with said drum.

6. A filter comprising a rotary drum having an apertured periphery, a continuous filtering belt passing partially around the periphery of said drum, said belt engaging and leaving said drum at circumferentially spaced points, means for maintaining a differential pressure between the inside and outside of said drum, means operated by pressure of fluid filtered for sealing the portion of the drum periphery between said circumferential points, said drum provided near its ends with circumferential grooves and with openings establishing communication between said grooves and interior of the drum whereby the differential pressure in the filter will maintain a sealing contact between the edges of the filtering belt and the drum.

7. In a filter, a rotary drum having an apertured periphery, a continuous filtering belt passing partially around the periphery of said drum, said belt engaging and leaving said drum at circumferentially spaced points, means for maintaining the differential pressure between the inside and outside of said drum, annular channels formed within said drum near its ends, said drum provided with openings communicating with said channel and opening out through the outer surface of the drum, means for maintaining a pressure difference between the interior of the channel and the exterior of the drum whereby the edges of said filter belt will be maintained in sealing contact with the drum.

8. In a filter, a rotary drum having an apertured periphery, a continuous filtering belt passing partially around the periphery of said drum, said belt engaging and leaving said drum at circumferentially spaced points, means for maintaining a differential pressure between the inside and outside of the drum, pressure fluid operated means within said drum for sealing the portion of the drum periphery between said points, an inlet to said filter for fluid to be filtered, and means connecting said inlet and said sealing means whereby said sealing means will be operated by pressure of incoming liquid to be filtered.

9. In a filter, a rotary drum having an apertured periphery, end walls, and a flange extending radially inwardly from said periphery and forming with one of said end walls an annular channel, a continuous filtering belt passing partially around the periphery of said drum, a hydraulically actuated valve in said drum for sealing the remaining portion of said drum periphery, whereby a differential pressure between the inside and outside of said drum may be maintained, an inlet connection to said filter for delivering liquid to be filtered thereto, means connected to said valve for supplying operating pressure fluid thereto, and a connection between said inlet and said last named means for operating the last named means by pressure of incoming liquid to be filtered, and means for delivering the leakage from said hydraulically actuated valve to said annular channel.

10. In a filter, a rotary drum, a filtering belt passing partially around the periphery of the drum, an inlet connection to said filter for delivering liquid to be filtered thereto, a dished sealing plate presenting a concave surface to the inner surface of the remainder of the periphery of said drum and having its outer edge conforming with the periphery of the drum to effect sealing contact between said edge and the periphery of the drum, fluid actuated means for yieldably pressing said plate radially outwardly against said periphery, means for supplying fluid to said fluid actuated means, and a connection between said inlet and said fluid supplying means for operating the fluid supplying means by pressure of incoming liquid to be filtered.

NICOLAI H. HILLER.
EDWARD B. McCABE.